(12) United States Patent
Tang et al.

(10) Patent No.: US 8,207,701 B2
(45) Date of Patent: Jun. 26, 2012

(54) CONTROL METHOD OF ELECTROMOTOR

(75) Inventors: Xiaohua Tang, Shenzhen (CN);
Xuguang Zhou, Shenzhen (CN);
Hongbin Luo, Shenzhen (CH); Ming Yu, Shenzhen (CN); Nan Liu, Shenzhen (CN); Jian Gong, Shenzhen (CN);
Guangming Yang, Shenzhen (CN)

(73) Assignee: BYD Company, Ltd., Shenzhen (CN)

( * ) Notice: Subject to any disclaimer, the term of this patent is extended or adjusted under 35 U.S.C. 154(b) by 456 days.

(21) Appl. No.: 12/447,429

(22) PCT Filed: Oct. 31, 2006
(Under 37 CFR 1.47)

(86) PCT No.: PCT/CN2006/002916
§ 371 (c)(1),
(2), (4) Date: Apr. 27, 2009

(87) PCT Pub. No.: WO2008/052388
PCT Pub. Date: May 8, 2008

(65) Prior Publication Data
US 2010/0000815 A1    Jan. 7, 2010

(51) Int. Cl.
*H02P 23/00* (2006.01)
(52) U.S. Cl. .......................... 318/808; 318/809; 318/810
(58) Field of Classification Search ............... 318/400.1, 318/434, 808, 809, 810
See application file for complete search history.

(56) References Cited

U.S. PATENT DOCUMENTS

| | | | |
|---|---|---|---|
| 6,501,998 B1 | 12/2002 | Pfeiffer | 700/37 |
| 2002/0047680 A1 | 4/2002 | Frenzel et al. | 318/700 |
| 2003/0212516 A1* | 11/2003 | Ulrich | 702/60 |
| 2009/0244937 A1* | 10/2009 | Liu | 363/46 |
| 2010/0057284 A1* | 3/2010 | Tang et al. | 701/22 |
| 2010/0301787 A1* | 12/2010 | Gallegos-Lopez et al. | 318/400.02 |
| 2011/0050141 A1* | 3/2011 | Yeh et al. | 318/434 |

FOREIGN PATENT DOCUMENTS

| | | |
|---|---|---|
| CN | 1515068 A | 7/2004 |
| DE | 4321286 A1 | 1/1994 |
| EP | 0274582 A2 | 7/1988 |
| JP | 61-240884 | 10/1986 |
| JP | 7-327382 A | 12/1995 |
| JP | 11-337372 | 12/1999 |
| JP | 2003-189700 | 7/2003 |

OTHER PUBLICATIONS

Wang et al.; *Speed-adjustment System of Permanent Magnet Synchronous Generator*; Small & Special Machines, No. 9, 2004. International Search Report; PCT/CN2006/002916; Aug. 9, 2007; 3 pages.
European Patent Application 06817796.3, Office Action dated Jan. 7, 2010, 6 pgs.

* cited by examiner

*Primary Examiner* — Thomas Dougherty
(74) *Attorney, Agent, or Firm* — Morgan, Lewis & Bockius LLP

(57) ABSTRACT

A control method of the electromotor comprises: setting a target alternating axis current based on the rotor angular velocity of the electromotor and a target direct axis current based on the torque of the motor; simultaneously detecting three-phase currents and current rotor position angle of the electromotor; converting the three-phase currents to an actual alternating axis current and an actual direct axis current by Park and Clark conversions; inputting the difference between the target current and the actual current to a current loop, outputting the required direct axis current and the required alternating axis current; determining the three phase voltages according to the required direct axis current and alternating axis current and the angle of the electromotor rotor position; obtaining PWM control waveform through three-phase voltages, wherein said PWM control waveform is configured to control the conversion from direct current to alternating current and drives the electromotor.

9 Claims, 6 Drawing Sheets

CONTROL METHOD OF ELECTROMOTOR

CROSS REFERENCE TO RELATED APPLICATIONS

This Application is a United States National Stage Application filed under 35 U.S.C. §371 of PCT Patent Application Serial No. PCT/CN2006/002916 filed on Oct. 31, 2006, the disclosure of which is hereby incorporated by reference in its entirety.

BACKGROUND OF THE INVENTION

1. Field of the Invention

The present invention relates to a control method of the electromotor, more specifically, to a control method of the electromotor used in the electric vehicles.

2. Background of the Related Art

The existing control method of electromotor comprises the steps of: setting a target rotating velocity $n_{ref}$ of the electromotor rotor; detecting an actual rotating velocity n; inputting the difference between the target rotating velocity and the actual rotating velocity n to a velocity loop and performing PI regulation; outputting a required rotating velocity of the electromotor and detecting the rotor position of the electromotor to determine the angle of the rotor position; determining a required alternating axis current id' based on the required rotating velocity output by PI regulation; determining a required direct axis voltage ud and the required alternating voltage uq based on the direct axis current iq' calculated from the rotor angular velocity of the electromotor; and performing Clark and Park inverse conversions to the required direct axis voltage ud and the required alternating voltage uq according to the rotating velocity of the electromotor rotor; outputting three-phase voltages ua, ub and uc; calculating a duty ratio between pulse width modulation (PWM) control waveform and the three phases by the three-phase voltages ua, ub and uc to determine the pulse width modulation (PWM) control waveform, wherein said PWM control waveform is configured to control the conversion from direct current to alternating current and drive the electromotor. FIG. 1 is a view of a loop feedback circuit of the electromotor velocity to implement the above-noted electromotor control method.

The existing electromotor control method controls the electromotor using velocity: first performing PI regulation to the rotating velocity of the electromotor rotor, then controlling the electromotor torque by regulating the alternating axis current of the electromotor. Accordingly, the responding is relatively slow.

SUMMARY OF THE INVENTION

The present invention has been made in view of the above circumstance and provides an electromotor control method with faster responding.

According to an aspect of the invention, an electromotor control method comprises the steps of: setting a target alternating axis current iq* based on a target rotor angular velocity w* of the electromotor and setting a target direct axis current id* based on the torque of the electromotor; simultaneously detecting and collecting current three-phase currents ia, ib and ic of the electromotor and current rotor position angle θ of the electromotor; determining an actual electromotor rotor direct axis current id and an actual alternating axis current iq by performing Park conversion and Clark conversion to the current three-phase currents ia, ib and ic; inputting the difference between the target alternating axis current iq* and the actual alternating axis current iq, and the difference between the target direct axis current id* and the actual direct axis current id to a current loop, and further outputting a required direct current id' and a required alternating current iq' after performing PI regulation; determining a required direct axis voltage ud and a required alternating voltage uq based on the required direct axis current id' and the required alternating axis current iq' output by PI regulation; performing Park and Clark inverse conversions to the required direct axis voltage ud and the required alternating voltage uq according to the rotor position angle θ of the electromotor and the output three-phase voltages ua, ub and uc; calculating a duty ratio between PWM control waveform and the three phases and obtaining the PWM control waveform based on the calculated duty ratio, wherein said PWM control waveform is configured to control the conversion from direct current to alternating current and drive the electromotor using the converted alternating current.

The control method of the electromotor provided in the present invention employs current loop feedback control instead of velocity loop feedback control. Comparing to the velocity loop feedback control, the current loop feedback control applies PI regulation immediately to the direct axis current id and the alternating axis current iq of the electromotor. Thus a faster dynamic responding can be achieved.

BRIEF DESCRIPTION OF THE DRAWINGS

Embodiments of the invention will be described in detail based on the following figures, wherein.

DETAILED DESCRIPTION OF EMBODIMENTS

Hereinafter, an embodiment of the invention will be described in detail with reference to the accompanying drawings.

The electromotor control method provided in the present invention comprises the steps of: setting a target alternating axis current iq* based on a target rotor angular velocity w* of the electromotor and setting a target direct axis current id* based on the torque of the electromotor; simultaneously detecting and collecting present three-phase currents ia, ib and ic of the electromotor and current rotor position angle θ of the electromotor; determining an actual direct axis current id and an actual alternating axis current iq of the electromotor rotor by performing Park conversion and Clark conversion to the present three-phase currents ia, ib and ic; inputting the difference between the target alternating axis current iq* and the actual alternating axis current iq, and the difference between the target direct axis current id* and the actual direct axis current id to a current loop, and further outputting a required direct current id' and a required alternating current iq' after performing PI regulation to the inputs of the current loop; determining the required direct axis voltage ud and the required alternating axis voltage uq based on the required direct axis current id' and the required alternating axis current iq' output by PI regulation; Performing Park and Clark inverse conversions to the required direct axis voltage ud and the required alternating axis voltage uq based on the rotor position angle θ of the electromotor and outputting three-phase voltages ua, ub and uc; calculating a duty ratio between PWM control waveform and the three phases and determining the PWM control waveform based on the calculated duty ratio, wherein said PWM control waveform is configured to control the conversion from direct current to alternating current and drive the electromotor using the converted alternating current.

Figure 1:
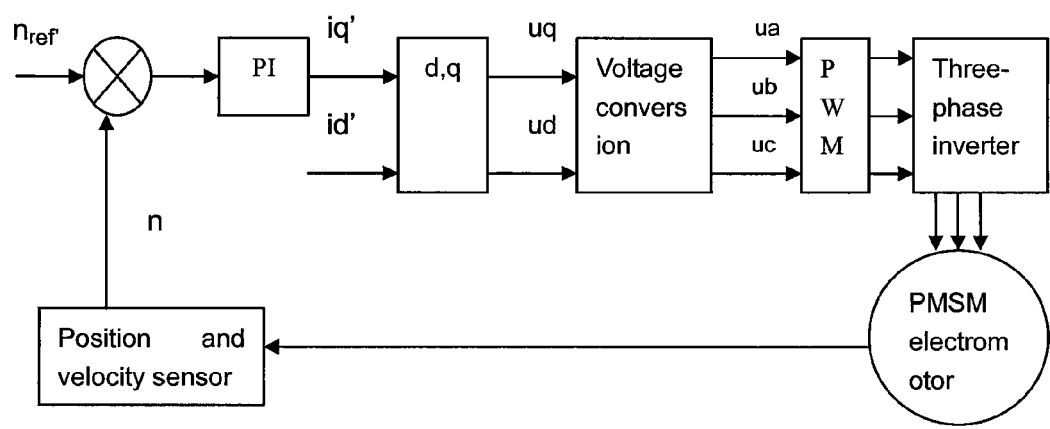
FIG. 1 is a view of a velocity loop feedback circuit to implement the electromotor control method in the prior art.
Figure 2:
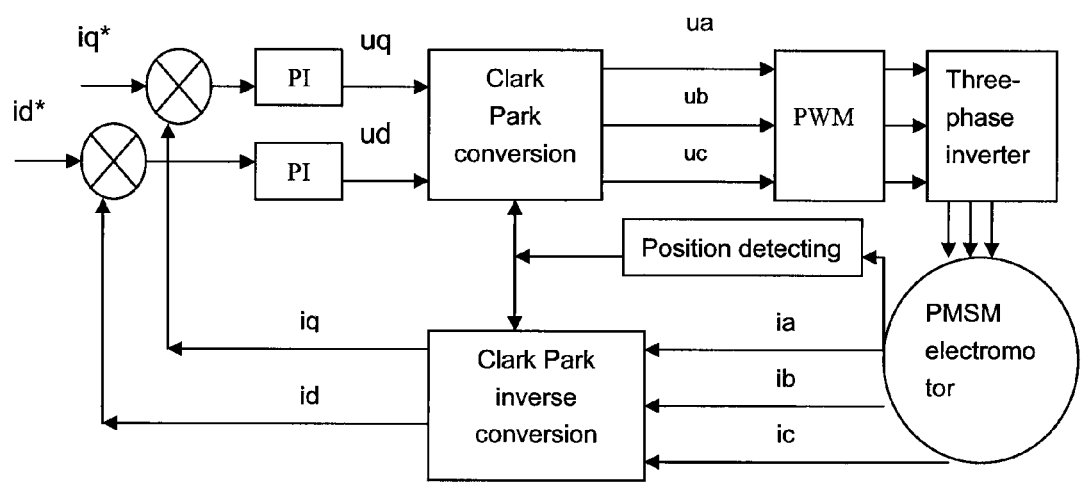
FIG. 2 is a view of a current loop feedback circuit to implement the electromotor control method in an embodiment of the present invention.

FIG. 2 is a view of a current loop feedback circuit of the electromotor to implement the above steps.

Figure 3:
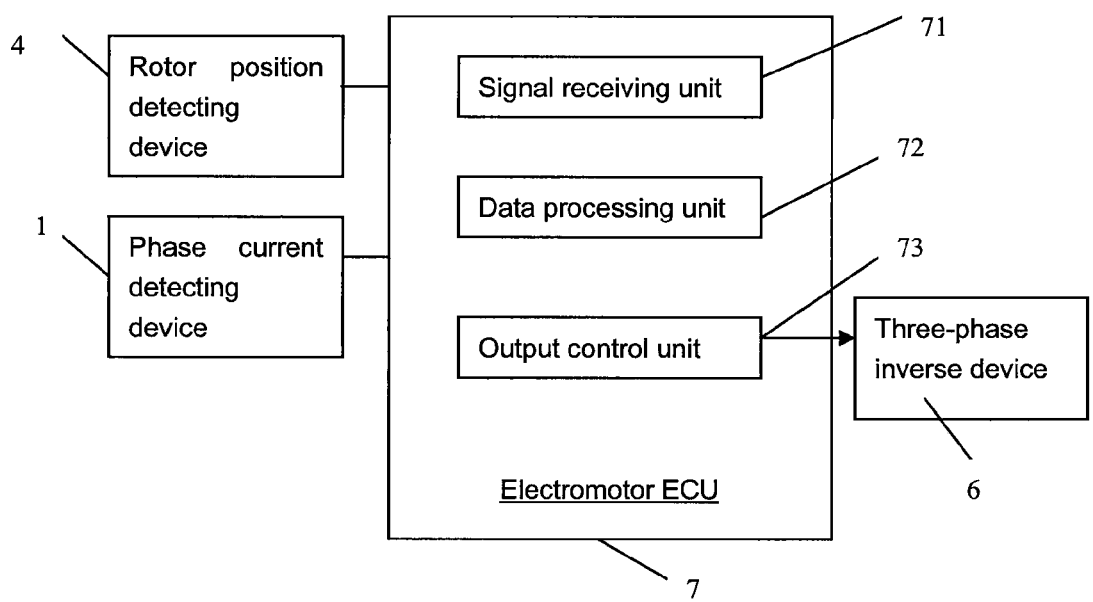
FIG. 3 is a view showing the component modules of the electromotor control system to implement the electromotor control method in an embodiment of the present invention.

FIG. 3 is a view showing the components of the electromotor control system to implement the electromotor control method in an embodiment of the present invention. Said control system comprises: a phase current detecting device 1, a rotor position detecting device 4, an electromotor ECU 7 and a three-phase inverse device 6; wherein the electromotor ECU 7 comprises a signal receiving unit 71, a data processing unit 72 and an output control unit 73; wherein said signal receiving unit 71 is configured to receive a phase current signal and a rotor position angle signal detected and output by the phase current detecting device 1 and the rotor position detecting device 4, respectively. Further, said signal receiving unit 71 is configured to determine the phase current value and the rotor position angle θ of the electromotor therein; said data processing unit 72 calculates a PWM control waveform based on the rotor position angle θ and the phase current output by the signal receiving unit 71 and outputs said waveform to the output control unit 73; said output control unit 73 outputs the received PWM control waveform to the three-phase inverse device 6; said three-phase inverse device 6 converts the received direct current to a three-phase alternating current in order to drive the electromotor.

Said phase current detecting device 1 can be any apparatus capable of detecting three-phase currents, such as an alternating current sensor.

When said phase current detecting device 1 is an alternating current sensor, said electromotor control system further comprises a phase current signal conditioning circuit located between the alternating current sensor and the signal receiving unit 71; wherein said conditioning circuit comprises a voltage uplifting circuit and a second-order filter circuit. The conditioning circuit is used to convert the phase current signal to an input signal amplitude corresponding to the signal receiving unit 71 in the electromotor ECU 7. The components and the structure of the voltage uplifting circuit and the second-order filter circuit are known to those skilled in the art. The phase current signal will have phase shifting when it passes through the signal conditioning circuit. If at this point, the three-phase currents of the electromotor ia, ib and ic are directly introduced into the Park conversion and the Clark conversion equations, the actual direct axis current id and the actual alternating axis current iq can not be obtained. Therefore, said phase shifting needs to be corrected in the signal receiving unit 71 in the electromotor ECU 7, which will be detailed herein below.

Figure 5:
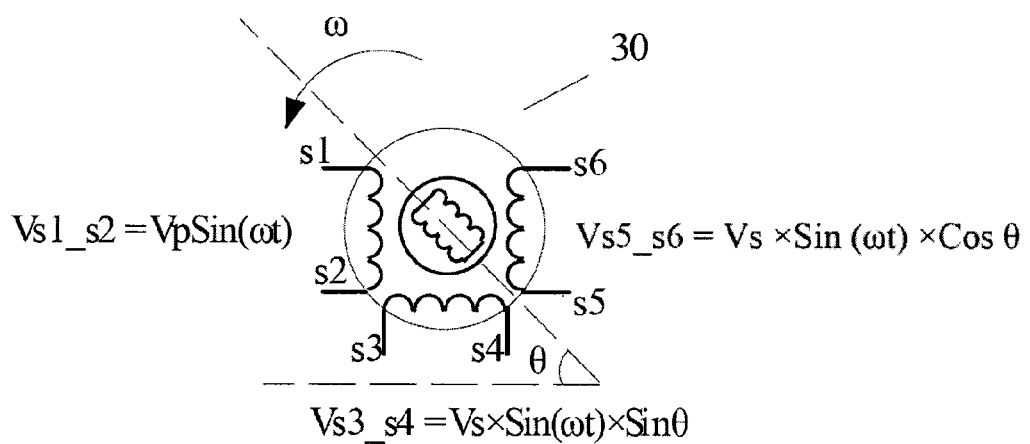
FIG. 5 is a view showing the structure of a resolver in the electromotor control system to implement the electromotor control method in an embodiment of the present invention.

Said rotor position detecting device 4 may be any apparatus capable of detecting position angle of the rotor, such as a resolver. The resolver has only three coils embedded inside and has no other electric elements. Therefore, it has relatively good resistance to oscillations, temperature, corrosion and interference. It can further be configured to meet the requirements of different operation conditions and high reliability. The interior structure of the resolver is shown in FIG. 5. S1-S2 is an input excitation winding. S3-S4 is a sine output winding. S5-S6 is a cosine output winding. The resolver has one sine excitation signal as input and two-phase orthogonal sine signals as output. An independent winding on the rotor generates a coupling magnetic field while rotating. The working principle of the three windings can be denoted in the following equation:

$$Vs1\_s2 = Vp \times \operatorname{Sin}(\omega t)$$

Figure 6:
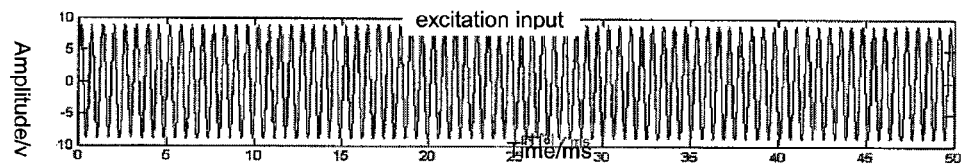
FIG. 6 is a view showing the waveform of an actual magnetic exciting signal of the resolver in the electromotor control system to implement the electromotor control method in an embodiment of the present invention.

FIG. 6 is a view of an actual waveform of the excitation winding signal.

Figure 7:
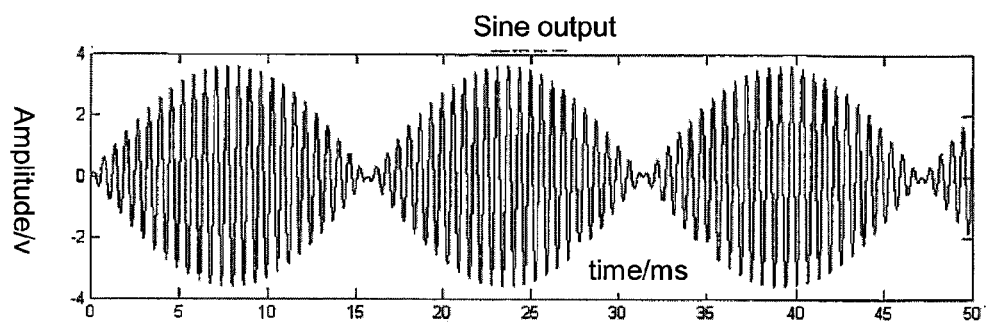
FIG. 7 is a view showing a sine output signal waveform of the resolver in the electromotor control system to implement the electromotor control method in an embodiment of the present invention.
Figure 8:
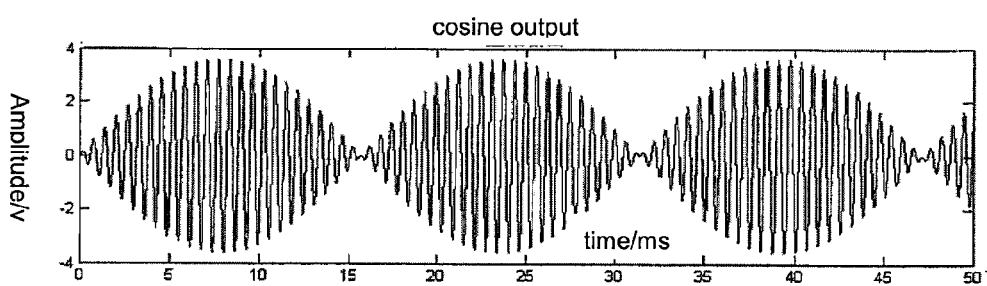
FIG. 8 is a view showing a cosine output signal waveform of the resolver in the electromotor control system to implement the electromotor control method in an embodiment of the present invention.

The induced electromotive forces on the sine winding and the cosine winding are denoted in the following equations, respectively:

$$Vs3\_s4 = Vs \times \operatorname{Sin}(\omega t) \times \operatorname{Sin} \theta \quad (1)$$

$$Vs5\_s6 = Vs \times \operatorname{Sin}(\omega t) \times \cos \theta \quad (2)$$

Wherein Vs=kVp. k is a transfer ratio. FIGS. 7 and 8 are the output signal waveforms of the sine winding and the cosine winding, respectively.

According to Eq. (1) and Eq. (2), we have $$\operatorname{Tan} \theta = Vs3\_s4 / Vs5\_s6 \quad (3)$$

According to Eq. (3), the rotor axis angle can be determined using the amplitude and the polarity of the detected sine and cosine signals. The resolver further comprises a resolving unit to sample the analog signal of the rotor position output from the resolver and to convert it to a digital rotor position angle θ of the electromotor. Said resolving unit will be further explained in the receiving unit 71 of the electromotor ECU 7.

When the rotor position detecting device 4 is a resolver, said control system may further comprise a differential power amplifying unit connected between the input winding of the resolver and the signal receiving unit 71. The differential power amplifying unit is configured to reduce waveform distortion effectively. Said control system may further comprise a low pass filter unit connected between the two output windings of the resolver and the receiving unit 71. Said low pass filter unit is configured to resist interference and further restrict the amplitude of the sine and the cosine signals output from the resolver to conform to the requirements of the signal receiving unit 71 of the electromotor ECU 7. In some embodiments, said low pass filter unit is a Π form RC filter.

The receiving unit 71 of said electromotor ECU 7 is configured to receive signals output from the rotor position detecting device 4 and the phase current detecting device 1, respectively. Said signal receiving unit 71 may comprise a signal receiving circuit, an A/D converting circuit and a filtering circuit. The structure of said signal receiving unit 71 is known to those skilled in the art.

Figure 4:
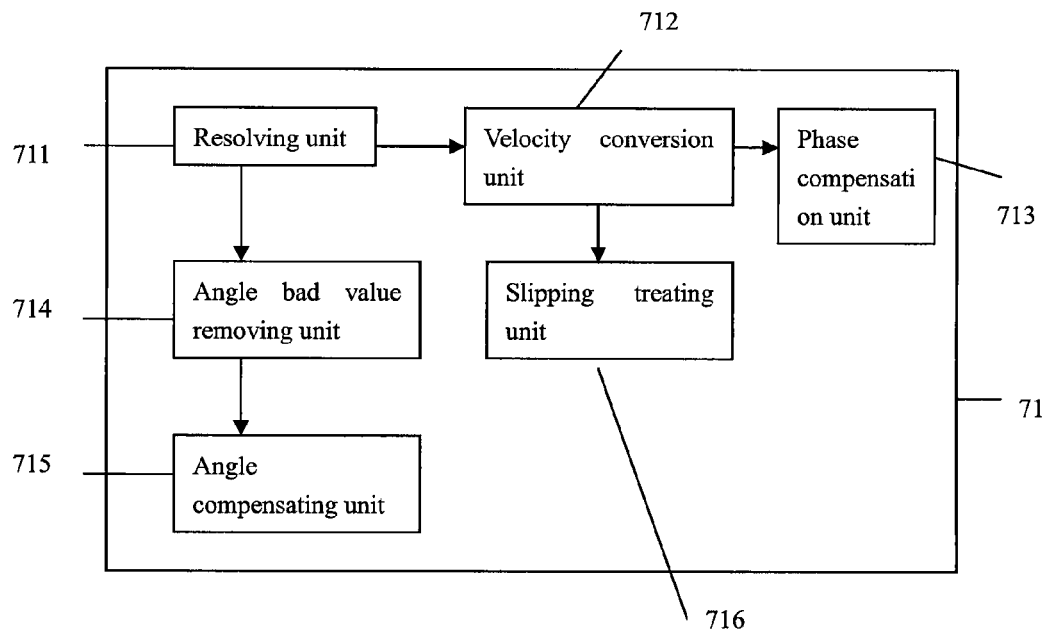
FIG. 4 is a view showing the structure of a signal receiving module of the electromotor control system to implement the electromotor control method in an embodiment of the present invention.

As shown in FIG. 4, said signal receiving unit 71 comprises a resolving unit 711, which is configured to sample and calculate the analog rotor position angle signal output from the rotor position detecting device 4, convert it into a digital rotor position angle θ, and further output the converted digital rotor position angle θ to the data processing unit 72 of the electromotor ECU 7. For example, the resolving unit 711 calculates the position of the electromotor rotor based on the sine signal and the cosine signal output from the resolver, defining the electromotor rotor position angle θ to be between 0° and 360° such that the corresponding output electromotor rotor position angle θ of the resolving unit 711 is between 0 and 4095. The defined value can be determined by those of skilled in the art based on the specific requirements and the sampling precision.

As shown in FIG. 4, in some embodiments, said signal receiving unit further comprises a velocity converting unit 712, which is used to convert the rotor position angle θ of the electromotor to a current rotor angular velocity co and a current rotor acceleration of the electromotor. The velocity converting unit 712 is known to those skilled in the art.

In some embodiments, said control method further comprises a step to remove the bad values of the angle. In some embodiments, said method further comprises an angle compensation step and a slipping treating step. As shown in FIG. 4, said signal receiving unit 71 further comprises an angle bad value removing unit 714 to remove the bad values of the angle, an angle compensation unit 715 to perform angle compensation, and a slipping treating unit to manage slipping status.

Removing the bad values of the angle comprises the steps of: sampling the rotor angular velocity ω of the electromotor at interval; multiplying the sampling time interval t with the rotor angular velocity ω of the electromotor; adding a rotor position angle θ2 of the electromotor at a former sampling time interval to obtain a correction angle value θ1'; calculating the difference Δθ between a current electromotor rotor angle θ1 and the former electromotor rotor angle θ2; setting the current angle correction value θ1' to be the current electromotor rotor position angle value θ1, if Δθ is beyond a pre-determined error range.

The angle compensation step is described in detail herein below. Within the predetermined time interval T, when the frequency of Δθ being outside the predetermined error range is greater than a predetermined value N, the angle compensation step stops outputting the PWM control waveform such that the rotation of the electromotor is terminated; wherein the predetermined time interval T is 1 to 3 minutes and the predetermined value N is 4 to 6 times. For example, setting the predetermined time interval T as 3 minutes and the predetermined value N as 4 means that if within 3 minutes, the frequency of Δθ being outside the predetermined error range is greater than 4, the angle compensation unit 722 will send a signal to the output control unit 73 to stop outputting the PWM control waveform.

According to an aspect of the invention, by employing the angle bad value removing step and the angle compensation step, not only the control method improves the anti-interference performance in angle detection such that the control losing situation of an electromotor due to rotor position error can be avoided; but also the control method enhances the stability and reliability of the electromotor such that the operation termination situation of an electromotor due to occasional interference can be avoided.

The slipping treating step is described in detail herein below. When AO is within the predetermined error range, the slipping treating step calculates the current rotary velocity. The slipping treating step determines whether the current rotary velocity of the electromotor rotor is greater than a predetermined maximum acceleration value, if true, performing slipping management to eliminate the slipping of an electric vehicle, further, the torque of the electromotor is reduced to eliminate the slipping; wherein the slipping treating scheme is known to those skilled in the field.

The control method provided in the present invention employs slipping treating step, detecting whether the wheels of the electric vehicle are in slipping status based on the rotor's position rather than based on the comparison between the velocity of the driving wheels and the driven wheels in the prior art. Accordingly, the control method provided in the present invention saves the velocity sensors installed on the driven wheels and achieves faster responding speed and relatively higher accuracy.

When the control system comprises a phase current regulating circuit, the control method provided in the present invention further comprises a phase compensation step as shown in FIG. 3. Said signal receiving unit 71 further comprises a phase compensation unit 713 to perform phase compensation. The phase compensation comprises the steps of: presetting a correction angle, deciding whether said current electromotor rotor angular velocity ω is greater than 0; when ω is greater than 0, subtracting the phase shifting angle from the detected phase angle of the present phase current; when ω is less than 0, adding the correction angle to the detected phase angle of the present phase current; wherein, the correction angle is calculated by multiplying the delay time of the current conditioning circuit with the present phase current frequency. The methods of correction angle calculation differ according to different current conditioning circuit. According to one embodiment of the present invention, the correction angle=102°×(the current angular velocity ω of the electromotor rotor/1100). Wherein, 102° refers to a signal phase shifting parameter of the analog circuit detected by the signal generator at the current rotor angular velocity ω of the electromotor of 1100 rad/s, wherein the phase shifting is essentially increased linearly with the increasing of the rotor angular velocity ω of the electromotor. Accordingly, the signal after compensation is restored to a signal which conforms to an actual current of the electromotor.

The data processing unit 72 of said electromotor ECU 7 is configured to process the data output from the signal receiving unit 71 according to the steps detailed herein below:

(1) Setting a target direct axis current id based on a rotor angular velocity ω of the electromotor and setting a target alternating axis current iq based on the torque of the electromotor.

The method of setting the target direct axis current id based on the rotor angular velocity ω of the electromotor and setting the target alternating axis current iq based on the torque of the electromotor is known to those skilled in this field.

Setting a maximum alternating axis current value iqmax of the electromotor based on the characters of IPM and a permanent magnet synchronized electromotor, wherein the setting basis is known to those skilled in the field; further calculating a corresponding target alternating axis current iq according to an electromotor control torque T, a maximum torque of the electromotor Tmax and a maximum torque of the alternating current iqmax using the following equation:

$$iq = iq\max \times \frac{T}{T\max}$$

Wherein, the maximum torque of the electromotor Tmax is default for a given electromotor. Said method of calculating the target direct current id according to the electromotor rotor angular velocity ω can be any available methods known to those skilled in the art. For example, one calculation method is detailed as below: since the rotor angular velocity ω is linear to the direct current id, the method selects an initial rotor angular velocity ω1 when the target direct current id is 0, a direct current id1 when the electromotor rotor angular velocity ω is 0, a constant maximum rotor angular velocity ωmax of the electromotor, a direct current id2 corresponding to the maximum rotor angular velocity ωmax and the current rotor angular velocity ω of the electromotor, and further calculates the target direct axis current id, wherein $$id = (id2 - id1) \times \frac{\varpi - \omega 1}{\omega\max}.$$

Further, the calculation can be done in separate sections because the rotor angular velocity ω of the electromotor may be linear to the direct current id in separate sections.

According to another embodiment in the present invention, the torque of the electromotor is calculated based on the depth of an accelerator, the depth of a break and a shifting information; wherein the depth of the accelerator and the depth of the break are detected and transmitted to the electromotor control ECU by a sensor, and the shifting information includes: hand break (HB), foot break (FB), parking position (P), reverse position (R), neutral position (N) and driving position (D). The electromotor and the wheels of the electric vehicle are mechanically connected by gears with a transformation ratio of 5.4:1. Speed of an electric vehicle is controlled by the electromotor rotation speed, which is adjusted by pressing the accelerator. Therefore, a continuous variable transmission can be achieved.

(2) Determining an actual direct current id and an actual direct current iq by Park conversion and Clark conversion to three-phase currents ia, ib and ic of the electromotor according to the rotor position angle θ of the electromotor.

Setting the direct axis of the electromotor rotor as d axis; setting the alternating axis of the electromotor, which is delayed 90 electrical angle to the direct axis in clockwise as q axis; setting the actual currents of the direct axis and the alternating axis as id and iq, respectively; calculating the actual direct axis current id and the actual alternating axis current iq using Park conversion and Clark conversion as denoted in the equations below:

$$\begin{bmatrix} id \\ iq \end{bmatrix} = \sqrt{\frac{2}{3}} \begin{bmatrix} \cos\theta & \sin(\theta - 30°) & -\sin(\theta + 30°) \\ \sin\theta & -\sin(\theta + 60°) & \sin(\theta + 120°) \end{bmatrix} \begin{bmatrix} ia \\ ib \\ ic \end{bmatrix}$$

(3) Inputting the difference between the target current and the actual current to a current loop; performing PI regulation; outputting the required direct axis current id' and the required alternating axis current iq' and calculating the required direct axis voltage ud and the required alternating axis voltage uq.

Calculating the difference between the target direct axis current id* and the actual direct axis current id and the difference between the target alternating axis current iq* and the actual alternating axis current iq'; determining the required direct axis current id' and the required alternating axis current iq' using proportional integration (PI) regulation; wherein said PI regulation process and the mathematic model of a PI regulator are known to those skilled in the filed. For example, the time domain mathematic model of the proportional integration regulator is shown as below:

$$u(t) = Kp\left[e(t) + \frac{1}{Ti}\int_0^t e(t)dt\right]$$

Wherein, Kp is a proportional coefficient; Ti is an integration coefficient (also works as integration time). Both are determined by practical matching according to vehicle service quality and motor working condition. The role of Kp is to accelerate the responding speed and to enhance the regulation accuracy of the system. When Kp increases, the responding speed of the system gets faster, and the regulation accuracy gets higher. However, the system may easily get over-regulated, thus the stability may get worse. If the value of Kp is too small, the regulation accuracy will decrease, the responding speed will be slower and the time required for regulation will be prolonged. Accordingly, the dynamic and static performances of the system will deteriorate. The role of Ti is to eliminate the steady-state error. The larger Ti is, the faster the system eliminates the steady-state error. However, if the value of Ti is too large, the integration saturation will arise at the beginning of the responding process; if the value of Ti is too small, the steady-state error is difficult to eliminate. Accordingly, too small value of Ti will affect the regulation accuracy of the system.

At a low speed, as the control voltage of the electromotor is low, a little over-regulation of the proportional integration will cause sharp change of the control voltage. As a result, it will cause the vibration of the electromotor. In some embodiments, to eliminate the effect, the PI regulation in said method comprises a PI frequency regulation step: setting a rotating speed threshold value; predetermining a high speed PI integration frequency and a low speed PI integration frequency; when the rotating speed of the electromotor rotor is higher than said predetermined rotating speed threshold value, setting the predetermined high speed PI integration frequency to be the frequency of the PI regulator; when the rotating speed of the electromotor rotor is lower than said predetermined rotating speed threshold value, setting the predetermined low speed PI integration frequency to be the frequency of the PI regulator.

Wherein, the predetermined rotating speed threshold value and the predetermined high speed PI integration frequency are determined based on the condition of the electromotor. For example, if the predetermined rotating speed threshold value is 300-500 rad/min, the predetermined high speed integration frequency is 2000-10000 Hz and the predetermined low speed PI integration frequency is 500-1000 Hz. According to the aspect of another embodiment in the present invention, the predetermined rotating speed threshold value is 300 rad/min, the predetermined high speed PI integration frequency is 2000 Hz and the predetermined low speed PI integration speed is 500 Hz, i.e., when the rotating speed of the electromotor is greater than 300 rad/min, setting the integration frequency of the PI regulator to be 2000 Hz, and when the rotating speed of the electromotor is lower than 300 rad/min, setting the integration frequency of the PI regulator to be 500 Hz.

Wherein, the rotating speed of the electromotor rotor can be obtained using a conversion of the rotor angular velocity ω of the electromotor, wherein the conversion equation is known to those skilled in the art. Herein, the rotating speed of the electromotor rotor is the number of the rotated circles in one minute, and the rotor angular velocity ω of the electromotor is the rotated radian in one second.

The control method provided in the present invention employs the frequency regulation step, which eliminates the over-regulation of the PI integration due to high speed regulation. As a result, it ensures the stable operation of the electromotor at a low speed.

Further, calculating the required direct axis voltage ud and the required alternating axis voltage uq according to the required direct axis current id' and the required alternating current iq' using the following equations:

$$ud = \overline{\omega} Lq iq' + Rid'$$

$$uq = -(\overline{\omega} Ld id' + \Psi \overline{\omega}) + Riq'$$

Wherein, Ld is a direct axis inductance; Lq is an alternating axis inductance; Ψ is a permanent magnet chain of the rotor; R is an electromotor impedance. These values can be measured and calculated on a given motor, wherein the calculation method is known to those skilled in this field.

(4) Performing Park and Clark inverse conversions to the required direct axis voltage ud and the required alternating axis voltage uq based on the rotor position angle θ of the electromotor:

$$\begin{bmatrix} ua \\ ub \\ uc \end{bmatrix} = \sqrt{\frac{2}{3}} \begin{bmatrix} \cos\theta & \sin\theta \\ \sin(\theta - 30°) & -\sin(\theta + 60°) \\ -\sin(\theta + 30°) & \sin(\theta + 120°) \end{bmatrix} \begin{bmatrix} ud \\ uq \end{bmatrix}$$

(5) Calculating a duty ratio between PWM control waveform and the three phases and determining the PWM control waveform by calculating the three-phase voltages ua, ub and uc, wherein said PWM control waveform is configured to control the conversion from direct current to alternating current and drive the electromotor. Wherein, obtaining the duty ratio of the PWM control waveform and the PWM control waveform according to the three-phase voltages can be achieved by employing a special calculating chip, of which the PWM waveform generator embedded within the special calculating chip will automatically generate different modulated pulse widths based on the calculated three-phase voltages ua, ub and uc.

The output control unit 73 of said electromotor ECU7 is configured to output the PWM control waveform obtained in the data processing unit 72 to the three-phase inverse device 6.

Each unit and subunit of said electromotor ECU7 can be implemented by employing circuits for separate components, by a single chip computer with integrated processors, or by a special electromotor control processor DSP.

Figure 9:
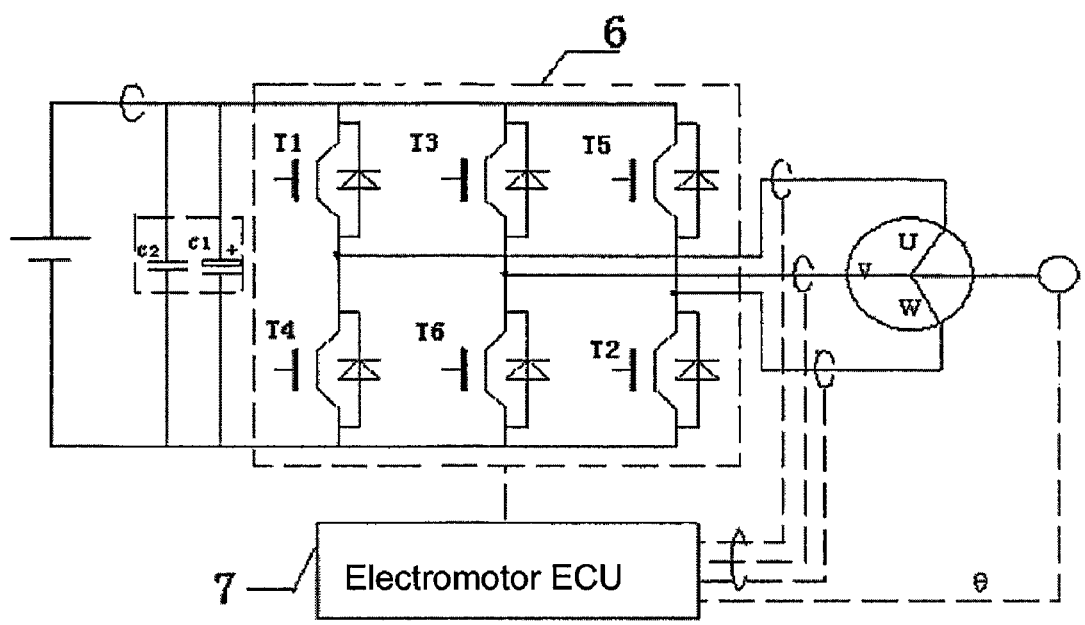
FIG. 9 is a view showing the principle diagram of the electromotor control system to implement the electromotor control method in an embodiment of the present invention.

The role of said three-phase inverse device 6 is to convert direct voltage into three-phase alternating voltage in order to drive the motor, wherein said three-phase inverse device 6 comprises a direct current input end, an alternating output end, multiple IPMs and a driving board; wherein said driving board is configured to receive the PWM control waveform from the output control unit 73 and control the connecting sequence, shut-off time and connecting time of the multiple IPMs based on said PWM control waveform. For example, as shown in FIG. 9, three-three connecting is employed. The three-phase inverse device 6 comprises U phase branch circuits connected in parallel, V phase branch circuits and W phase branch circuits, alternating output ends connected to the outlet terminals of the windings U, V and W of the permanent magnet synchronized electromotor M respectively, a direct current input end connected to battery B, wherein two IPMs serially connected are set in each phase branch circuit. Each IPM comprises an IGBT (Insulated Gate Bipolar Transistor) (one of T1-T6) and a fly-wheel diode D which is reversely connected to each IGBT and a protection circuit of IGBT in parallel. The joint of the two IPMs serially connected in each branch circuit is connected to a respective alternating current input end of each branch circuit. The other unconnected ends of the two IPMs in each branch circuit are parallel to each other and connected to the direct current output ends. Said driving board is further used to insulate the PWM control waveform, to amplify and to drive the electromotor.

FIG. 9 is a principle drawing of the electromotor control system of the electromotor control method provided in the present invention. The working principle of said three-phase inverse device 6 is described in detail according to FIG. 9: at a certain point, T1, T6 and T2 are conducted, the current flows from the up bridge arm T1 to T6 and T2 at the same time; when T1, T6 and T2 are shut off, as the stator of the electromotor continues to rotate and cut the magnetic lines, the current dramatically changes and the result of L×di/dt enlarges. Even the rotating speed of the electromotor is very low, a high induction electromotive force can be generated.

In some embodiments, a capacitor is connected in parallel between the two direct current input ends of the three-phase inverse device 6 to smooth the direct voltage.

The foregoing description of the embodiments of the present invention has been provided for the purpose of illustration and description. It is not intended to be exhaustive or limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method of controlling an electromotor comprising:
    setting a target alternating axis current iq* based on a rotor angular velocity ω* of the electromotor and a target direct axis current id* based on the torque of the electromotor;
    simultaneously detecting three-phase currents ia, ib and ic and current rotor position angle θ of the electromotor;
    converting the three-phase currents ia, ib and ic of the electromotor to an actual alternating axis current iq and an actual direct axis current id by Park conversion and Clark conversion based on the rotor position angle θ of the electromotor;
    inputting the difference between the target alternating axis current iq* and the actual alternating axis current iq and the difference between the direct axis target current id* and the direct axis actual current id to a current loop, and outputting a required direct axis current id' and a required alternating axis current iq' after performing PI regulation to the input of the current loop;

determining a required direct axis voltage ud and a required alternating voltage uq based on the required direct axis current id' and the required alternating axis current iq' output by the PI regulation;

performing Park and Clark inverse conversions to the required direct axis voltage ud and the required alternating voltage uq based on the rotor position angle θ of the electromotor to determine three-phase voltages ua, ub and uc;

calculating a duty ratio between PWM control waveform and the three-phase voltages ua, ub and uc to determine the PWM control waveform based on the duty ratio, wherein said PWM control waveform is configured to control the conversion from a direct current to an alternating current, and drive the electromotor using the converted alternating current; and wherein, said control method is configured to determine whether the current rotor acceleration of the electromotor is greater than a predetermined maximum acceleration and, if true, perform slipping management to eliminate the slipping of an electric vehicle.

2. The control method of claim 1, wherein, said step of detecting current rotor position angle θ further comprises a step of removing bad angle values, wherein removing bad angle values further comprises:

sampling the rotor angular velocity ω of the electromotor at a t interval;

multiplying the sampling time interval t with the rotor angular velocity ω of the electromotor, then adding a rotor position angle θ2 of the electromotor at a former sampling time interval to obtain current sampling angle correction value θ1';

calculating the difference Δθ between a current electromotor rotor angle θ1 and the former electromotor rotor angle θ2; and setting the current sampling angle correction value θ1' to be the current rotor position angle θ1 of the electromotor, if Δθ is beyond a predetermined error range.

3. The control method of claim 2, wherein said step of detecting current rotor position angle θ further comprises an angle compensation step of terminating the rotation of the electromotor when the frequency of Δθ being outside the predetermined error range within a predetermined time T is greater than a predetermined value N.

4. The control method of claim 3, wherein T is 1 to 3 minutes and N is 4 to 6.

5. The control method of claim 3, wherein T is 3 minutes and N is 4.

6. The control method of claim 1, wherein said step of detecting the three-phase currents ia, ib and is of the electromotor further comprises a phase compensation step, wherein said phase compensation step comprises:

presetting a correction angle, deciding whether said electromotor rotor angular velocity ω is greater than 0;

subtracting a phase shifting angle of a current phase current from a phase angle of a detected current phase current while ω is greater than 0; and adding the correction angle to the detected phase angle of the current phase current while ω is less than 0.

7. The control method of claim 6, wherein the value of the correction angle is 102°×(the current angular velocity ω of the electromotor rotor/1100).

8. The control method of claim 1, wherein the PI regulation further comprises a PI frequency regulation step, wherein the PI frequency regulation step comprises:

presetting a rotating speed threshold value;

setting a high speed PI integration frequency as the frequency of a PI regulator while the rotating speed of the electromotor rotor is higher than the predetermined rotating speed threshold value; and setting a low speed PI integration frequency as the frequency of the PI regulator while the rotating speed of the electromotor rotor is lower than the predetermined rotating speed threshold value.

9. The control method of claim 8, wherein the predetermined rotating speed threshold value is 300-500 rad/min, the predetermined high speed integration frequency is 2000-10000 Hz and the predetermined low speed PI integration frequency is 500-1000 Hz.

* * * * *

UNITED STATES PATENT AND TRADEMARK OFFICE
CERTIFICATE OF CORRECTION

PATENT NO. : 8,207,701 B2
APPLICATION NO. : 12/447429
DATED : June 26, 2012
INVENTOR(S) : Tang et al.

It is certified that error appears in the above-identified patent and that said Letters Patent is hereby corrected as shown below:

In Column 12, line 10, please delete "is" and add -- ic --.

Signed and Sealed this
Twenty-eighth Day of August, 2012

David J. Kappos
*Director of the United States Patent and Trademark Office*